United States Patent [19]

Lindsay

[11] Patent Number: 5,577,582
[45] Date of Patent: Nov. 26, 1996

[54] POLYGONAL CLUTCH ASSEMBLY

[75] Inventor: Alan R. Lindsay, Scarborough, Canada

[73] Assignee: Tesma International Inc., Cocord, Canada

[21] Appl. No.: 425,625

[22] Filed: Apr. 20, 1995

[51] Int. Cl.⁶ ................................................. F16D 13/68
[52] U.S. Cl. ........................... 192/70.19; 192/107 R; 192/109 R; 188/71.5; 188/218 X L
[58] Field of Search ........................... 192/70.16, 70.19, 192/70.2, 107 R, 109 R; 188/71.5, 73.2, 218

[56] References Cited

U.S. PATENT DOCUMENTS

| | | | |
|---|---|---|---|
| 1,848,843 | 3/1932 | Ruesenberg | 192/70.19 |
| 3,621,945 | 11/1971 | Spry | 188/71.5 |
| 4,014,619 | 3/1977 | Good et al. | 192/70.2 |
| 4,068,747 | 1/1978 | Snoy | 192/70.2 |
| 4,997,073 | 3/1991 | Fujioka et al. | 192/70.2 |
| 5,454,454 | 10/1995 | Easton et al. | 188/71.5 |

FOREIGN PATENT DOCUMENTS 910464  11/1962  United Kingdom .................. 192/70.2

*Primary Examiner*—Richard M. Lorence
*Attorney, Agent, or Firm*—Cushman Darby & Cushman

[57] ABSTRACT

The present invention relates to a clutch assembly having an axial series of friction plates for selectively transmitting torque and rotation between drive and driven assemblies. Specifically, a clutch assembly is provided that, in accordance with the present invention, transmits torque between friction plates and annular portions of rotational members having interengaging, polygonal cross-sectional configurations. The clutch also includes plastically deformable tabs for retaining the axial series of friction plates within a clutch housing. As constructed and arranged, the clutch of the present invention is suitable for high stresses and maximizes clutch efficiency.

31 Claims, 7 Drawing Sheets

POLYGONAL CLUTCH ASSEMBLY

BACKGROUND OF THE INVENTION

1. Field of the Invention

The present invention relates to a clutch with friction plates, and in particular, to a polygonal clutch assembly housing polygonal friction plates.

2. Description of the Related Art

Multiple disk clutches for engaging and disengaging driving torque between input and output assemblies are known. Such clutches show adequate resistance to high stresses. Yet, those clutches as presently known exhibit several failings including resultant turbulence in connected transmissions and reduced clutch efficiency.

In traditional multiple disk clutch assemblies, an outside periphery of a first set of axially arranged friction disks are connected to an inside periphery of an outer clutch housing by spline connections. Similarly, a second set of friction disks, interposed between the first set of friction disks, are connected by spline connections between an inside periphery of the second set of friction disks and an outer periphery of an inside clutch hub. As arranged, the first and second sets of friction disks are free to move axially while being confined to rotate with the outer clutch housing and the inner clutch hub, respectively. Thus, when the first set of friction disks are pressured into contact with the second set of friction disks, the outer clutch housing rotates with the inner clutch hub thereby transmitting torque and rotation between associated input and output shafts. Several problems, however, are prevalent with such a configuration.

First, the spline connections cause turbulence in the connected transmissions. As the splines rotate through the hydraulic oil used to engage the clutch, the hydraulic oil foams. Such foaming detracts from the performance of the transmission. Second, peening of the splines reduces clutch efficiency. After frequent loading and unloading of the splines during operation of the clutch, the splines experience permanent deformation or peening of the contacting surfaces of the spline. This peening reduces the surface area of contact between the driving clutch housing or driven hub and the corresponding friction disks. Consequently, after peening of the splines, traditional clutch assemblies must transmit a given torque over a smaller surface area thereby reducing clutch efficiency. In response, heavier, thicker gauge splines must be used to resist the negative effects of peening. Unfortunately, thicker splines increases the weight of the clutch.

SUMMARY OF THE INVENTION

An object of the present invention is to provide a multiple plate clutch configuration that maximizes the area of contact between the friction plates and either the drive and driven assemblies thereby maximizing clutch efficiency. Additionally, it is an object of the present invention to provide a clutch configuration that substantially prevents the reduction of clutch efficiency caused by peening. It is a further object of the present invention to provide a clutch configuration that reduces turbulence in connected transmissions. Further, it is an object of the present invention to provide a clutch configuration that can transmit high torque loads over thinner gauge material than conventionally possible thereby reducing the weight of the clutch assembly. Finally, it is an object of the present invention to provide a clutch assembly that is easy and inexpensive to manufacture.

To achieve these objectives in accordance with the present invention, a polygonal clutch assembly transmits torque between a drive and driven assembly through peripheral polygonal surfaces of friction plates mated to corresponding polygonal surfaces of the drive and driven assemblies. By use of the polygonal configuration, spline connections are eliminated thereby reducing the weight of the clutch assembly. Moreover, the mating polygonal surfaces are not subject to deforming loads that reduce the areas of contact, nor do the polygonal surfaces foam the hydraulic oil. Thus, the polygonal clutch assembly according to the present invention transmits high torque loads without peening of splines or turbulence in connected transmissions.

In the preferred embodiment of the present invention, a first rotational member is connected to either a drive assembly or a driven assembly. The first rotational member has an exterior annular portion positioned generally coaxially and coextensively with an interior annular portion of a second rotational member. The second rotational member is connected to the other of the drive assembly or the driven assembly. The coaxial and coextensive arrangement of the first rotational member and the second rotational member forms an annular space between an exterior periphery of the interior annular portion and an interior periphery of the exterior annular portion. Disposed in the annular space is an axial series of annular friction members. The annular friction members have outer and inner peripheral surfaces that are adjacent to the interior periphery of the exterior annular portion and the exterior periphery of the interior annular portion, respectively. Specifically, an axial series of first annular friction members having generally axially facing, opposed, interengagable first friction surfaces is provided. An axial series of second annular friction members also having generally axially facing, opposed, interengagable second friction surfaces is interposed between the axial series of first annular friction members. The first and second annular friction members are movable axially between an inoperative position wherein the axially facing, opposed, interengagable surfaces of the first and second annular friction members are not in contact and thus capable of relative rotation and an operative position wherein the axially facing, opposed, interengagable surfaces of the first and second annular friction members are in contact and thus confined to common rotation.

To transmit torque, the interior periphery of the exterior annular portion and the outer peripheral surfaces of the first annular friction members are provided with mating interengaging polygonal cross-sectional configurations including spaced areas of contact between those members such that those members are confined to common rotation. Similarly, the exterior periphery of the interior annular portion and the inner peripheral surface of the second annular friction members are provided with mating interengaging polygonal cross-sectional configurations including spaced areas of contact also confining those members to common rotation. Thus, when the annular friction members are in the inoperative position, the first rotational member can rotate relative to the second rotational member. On the other hand, when the annular friction members are in the operative position, the first and second rotational members are confined to rotate together. In other words, the polygonal configuration allows the annular friction members to move axially within the annular space while confining the annular friction members to rotate with the annular portions to which they are associated.

By virtue of the geometry of the polygonal clutch assembly, spline connections are eliminated, and consequently, the present invention is not subject to peening and concomitant reduction is clutch efficiency. Additionally, the present invention does not cause turbulence in connected transmissions. The present invention also has the additional advantage of reducing the weight of the clutch assembly in two ways. First, heavy gauge splines are eliminated. Second, the polygonal clutch configuration accommodates higher torque loads with thinner gauge material than heretofore possible. Finally, the present invention has the advantage of being easily manufactured.

Other objects, features, and characteristics of the present invention as well as the methods of operation of related elements will become more apparent upon consideration of the following description and the appended claims with reference to the accompanying drawings, wherein like reference numbers designate corresponding parts in the various figures.

DETAILED DESCRIPTION OF THE PRESENTLY PREFERRED EMBODIMENT

Figure 1:
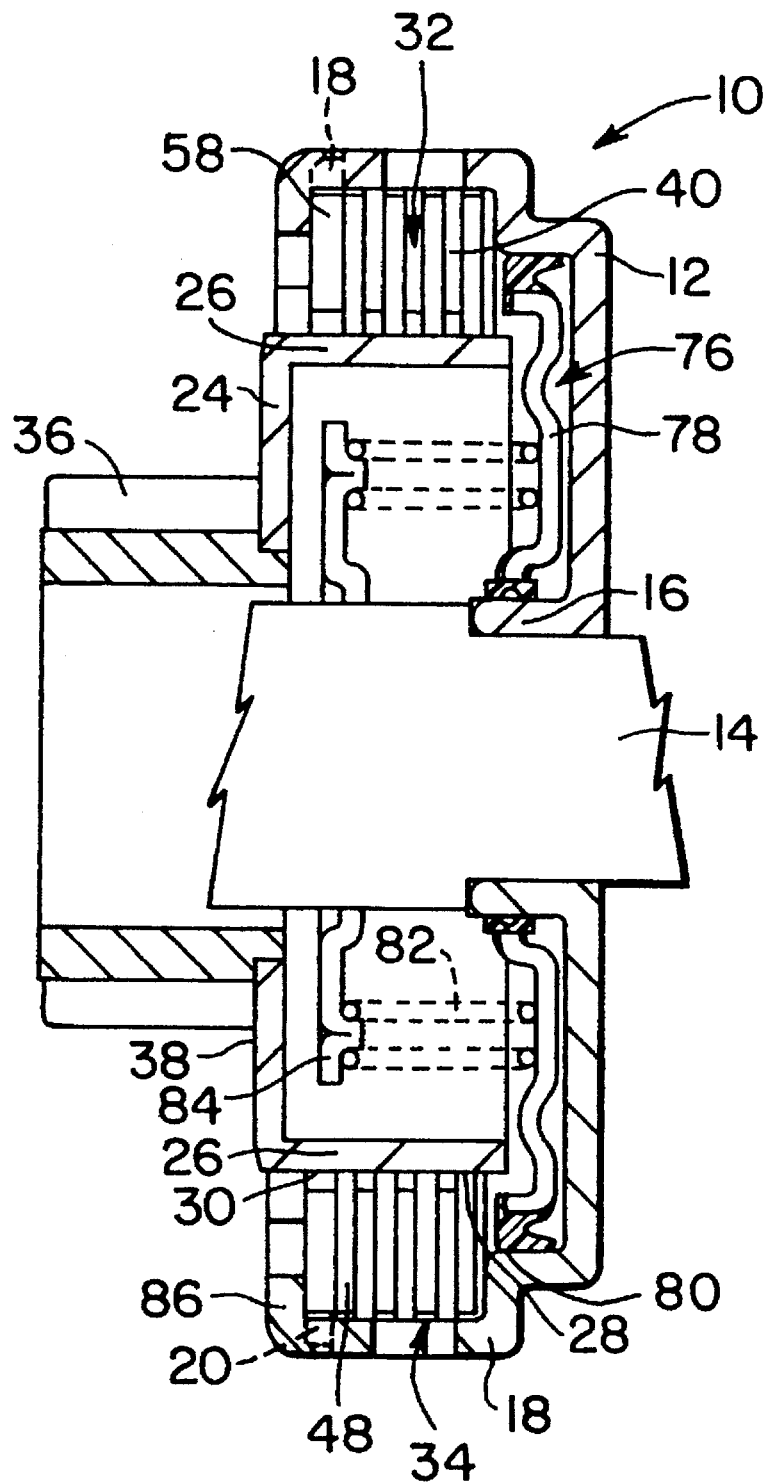
FIG. 1 is a sectional view of a polygonal clutch assembly in accordance with the present invention.

As shown in FIG. 1, a preferred embodiment of a polygonal clutch assembly in accordance with the present invention is designated generally by the reference number 10. The polygonal clutch assembly 10 is configured to selectably engage a drive assembly having an axis of rotation into operative association with a driven assembly having the same axis of rotation for common rotation. A first rotational member 12 is provided and is connectable to either a drive assembly or a driven assembly. As one skilled in the art will recognize readily upon reading the description that follows, the first rotational member 12 can be configured to connect to any drive or driven assembly including, for example, shafts or gears. For example, as shown in FIG. 1, a drive shaft 14 is connected to a hub 16 of the first rotational member 12.

Figure 5:
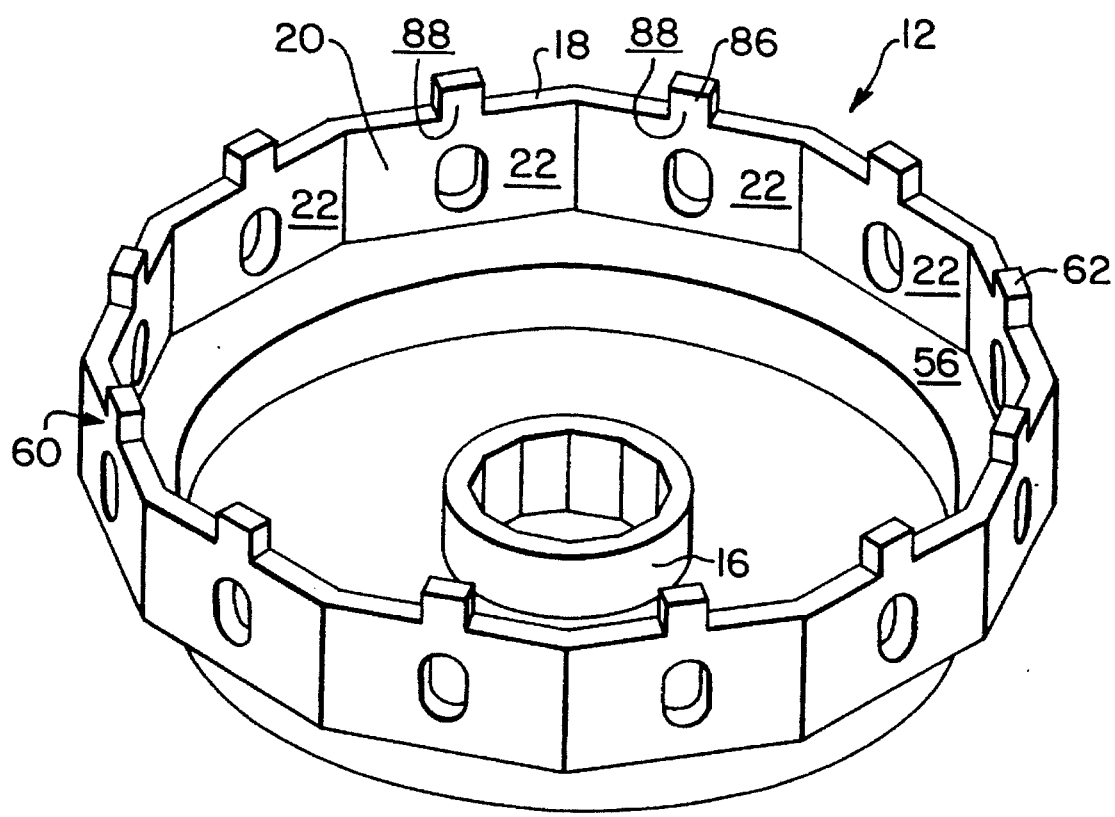
FIG. 5 is a perspective view of a polygonal clutch housing of the clutch assembly FIG. 1.
Figure 6:
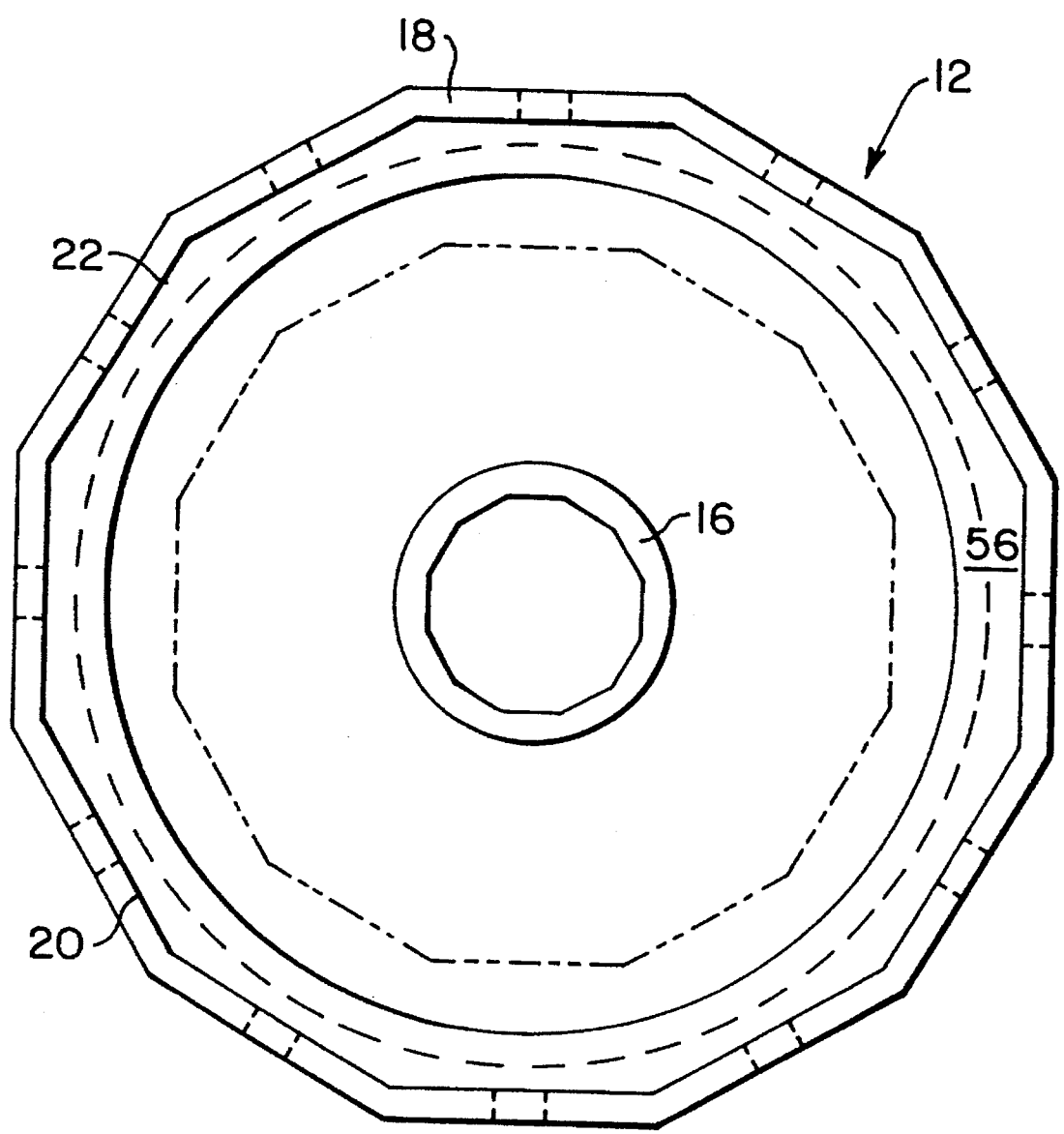
FIG. 6 is a plan view of the polygonal clutch housing of FIG. 5.
Figure 7:
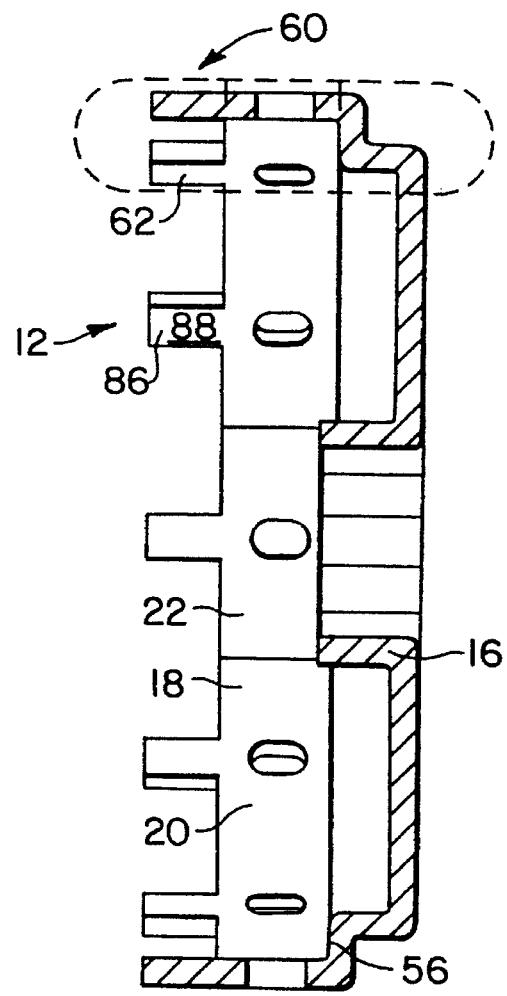
FIG. 7 is a sectional view of the polygonal clutch housing of FIG. 5.
Figure 8:
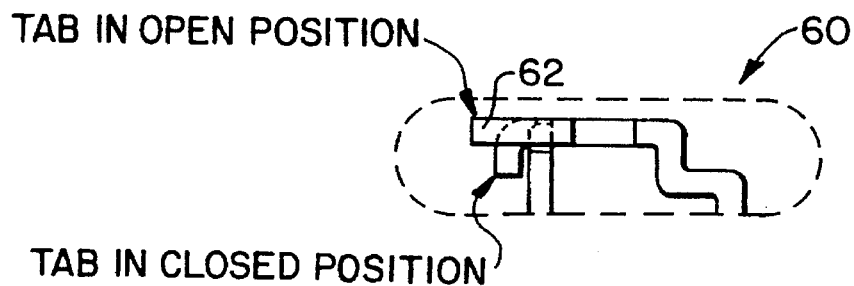
FIG. 8 is an exploded sectional view of a tab of the polygonal clutch housing of FIG. 5.

Specifically, as shown in FIGS. 1 and 5, the first rotational member 12 includes an exterior annular portion 18 having an interior, inwardly facing periphery 20 disposed circumferentially about and radially from the hub 16. In the preferred embodiment of the present invention, this configuration of the first rotational member 12 including the exterior annular portion 18 conveniently forms a clutch housing. In the broadest concept of the invention, however, the first rotational member 12 need not form a clutch housing. Additionally, as explained in more detail below, the interior periphery 20 of the exterior annular portion 18 has a polygonal configuration comprised of polygon sides 22. An operative number of polygon sides 22 is between 3 and 24 sides, and a preferred range is between 8 and 16 sides. Preferably, the polygonal configuration includes twelve polygon sides.

As shown in FIG. 1, a second rotational member 24 is positioned generally coaxially and coextensively with the first rotational member 12 and is configured to rotate with the other of the drive assembly or the driven assembly. The second rotational member 24 includes an interior annular portion 26 having an exterior, outwardly facing periphery 28 disposed circumferentially about and radially from the axis of rotation of the second rotational member 24. The exterior periphery 28 of the interior annular portion 26 is positioned generally coaxially and coextensively with the exterior annular portion 18 thereby forming an annular space 32 therebetween. Like the first rotational member 12 and as described in more detail below, the exterior periphery 28 of the interior annular portion 26 of the second rotational member 24 has a polygonal configuration comprised of polygon sides 30. Again, an operative number of polygon sides 30 is between 3 and 24 sides, and a preferred range is between 8 and 16 sides. Preferably, the polygonal configuration of the exterior periphery 28 includes twelve polygon sides.

In the broadest concept of the invention, however, only the first or second rotational members need have the interengaging, polygon, cross-sectional configurations. Preferably, both rotational members have the polygon configuration. Moreover, there is no requirement that the interior annular portion 26 and the exterior annular portion 18 include the same number of polygon sides. Additionally, as shown in the drawings, peripheral surfaces 44 and 54 of an axial series of annular friction members 34 preferably have the same number of polygon sides as the associated annular portions. In a broader concept of the invention, however, the peripheral surfaces 44 and 54 of the axial series of annular friction members 34 need only have a number of sides compatible with the configuration of the annular portions to which they are associated.

Finally, as shown in FIG. 1, a gear 36 for connection to a transmission is disposed on an axially facing surface 38 of the second rotational member 24. Again, as one skilled in the art will recognize readily, the first and second rotational members 12 and 24 may be connected to either a drive assembly or a driven assembly. Moreover, the drive and driven assemblies may be any suitable drive mechanism capable of transmitting the expected loads.

Disposed within the annular space 32 is the axial series of first and second annular friction members 34. In the preferred embodiment, the annular friction members 34 are flat discs. More particularly, the first annular friction members 40 comprise generally axially facing, opposed interengagable first friction surfaces 42. The first friction surfaces 42, as described below, are engagable upon similar surfaces 50 of the second annular friction members 48 to effect rotation of the drive and driven assemblies. Each of the first friction surfaces 42 are disposed between first generally outwardly facing outer peripheral surfaces 44 and first generally inwardly facing inner peripheral surfaces 46. In other words, the peripheral surfaces of the axial series of annular friction members 34 are the radially facing surfaces of the annular shaped friction members and are substantially perpendicular to the friction surfaces. Interposed between the first annular friction members 40 are second annular friction members 48. Likewise, the second annular friction members 48 comprise generally axially facing, opposed, interengagable second friction surfaces 50. Each of the second friction surfaces 50 are disposed between second generally outwardly facing outer peripheral surfaces 52 and second generally inwardly facing inner peripheral surfaces 54. Again, the peripheral surfaces 52 and 54 are substantially perpendicular to the second friction surfaces 50. As with traditional multiple disk clutches, the axial series of first and second annular friction members 34 is mounted within the annular space 32 for relative axial movement along the axis of rotation.

As constructed and arranged, the first and second generally outwardly facing outer peripheral surfaces 44 and 52 face the interior periphery 20 of the exterior annular portion 18. Similarly, the first and second generally inwardly facing inner peripheral surfaces 46 and 54 face the exterior periphery 28 of the interior annular portion 26. Moreover, because, as described above, the axial series of annular friction members 34 is mounted for axial movement, the inner peripheral surfaces 46 and 54 of both the first and second annular friction members 40 and 48 are movable axially relative to the exterior periphery 28 of the interior annular portion 26, and the outer peripheral surfaces 44 and 52 of the first and second annular friction members 40 and 48 are movably axially relative to the interior periphery 20 of the exterior annular portion 18. In the preferred embodiment of the present invention, the axial series of annular friction members 34 includes seven friction members. But, however, in the broadest concept of the invention and as one skilled in the art will recognize, only one first annular friction member and one second annular friction member are necessary to practice the invention. Finally, the axial series of annular friction members 34 abuts at one end upon a shoulder surface 56 of the first rotational member 12 so as to limit the axial travel of the axial series of annular friction members 34 in that direction. The spacing of the axial series of annular friction members 34 is controlled by a spacer 58, also mounted for axial movement, at the opposite end of the first rotational member 12. As described in more detail below, the axial series of first and second annular friction members 34 is retained within the annular space 32 by a retaining mechanism 60 having positionable members 62.

The interior periphery 20 of the exterior annular portion 18 and the generally outwardly facing outer peripheral surfaces 44 of the first annular friction members 40 have interengaging, polygonal cross-sectional configurations. Similarly, the exterior periphery 28 of the interior annular portion 26 and the generally inwardly facing inner surfaces 54 of the second annular friction members 48 have interengaging, polygonal cross-sectional configurations as well. Importantly, however, only the outer peripheral surfaces 44 of the first annular friction members 40 and the inner peripheral surfaces 54 of the second annular friction members 48 have the mating polygonal shape comprised of polygon sides 64 and 66, respectively. In other words, the first annular friction members 40 cannot rotate relative to the interior periphery of the exterior annular portion 18 because of the interengaging polygonal cross-sectional configuration. By comparison, the outer peripheral surfaces 52 of the second annular friction members 48 are configured to be rotatable relative to the interior periphery 20 of the exterior annular portion 18. Conversely, the second annular friction members 48 cannot rotate relative to the exterior periphery 28 of the interior annular portion 26 because of the interengaging polygonal configuration therebetween, and the first annular friction members 40 are configured to be rotatable relative to the exterior periphery 28 of the interior annular portion 26.

As explained in more detail below, the polygonal configurations provide spaced areas of contact extending generally tangentially to a circle concentric with the axis of rotation and extending to the confined peripheral surfaces 44 and 54. Given the polygonal configurations, the first annular friction members 40 are confined to rotate with the interior periphery 20 of the exterior annular portion 18, and the second annular friction members 48 are confined to rotate with the exterior periphery 28 of the interior annular portion 26. Yet, as described above, the annular friction members are free to move axially within the space defined between the shoulder surface 56 and the spacer 58.

Figure 2:
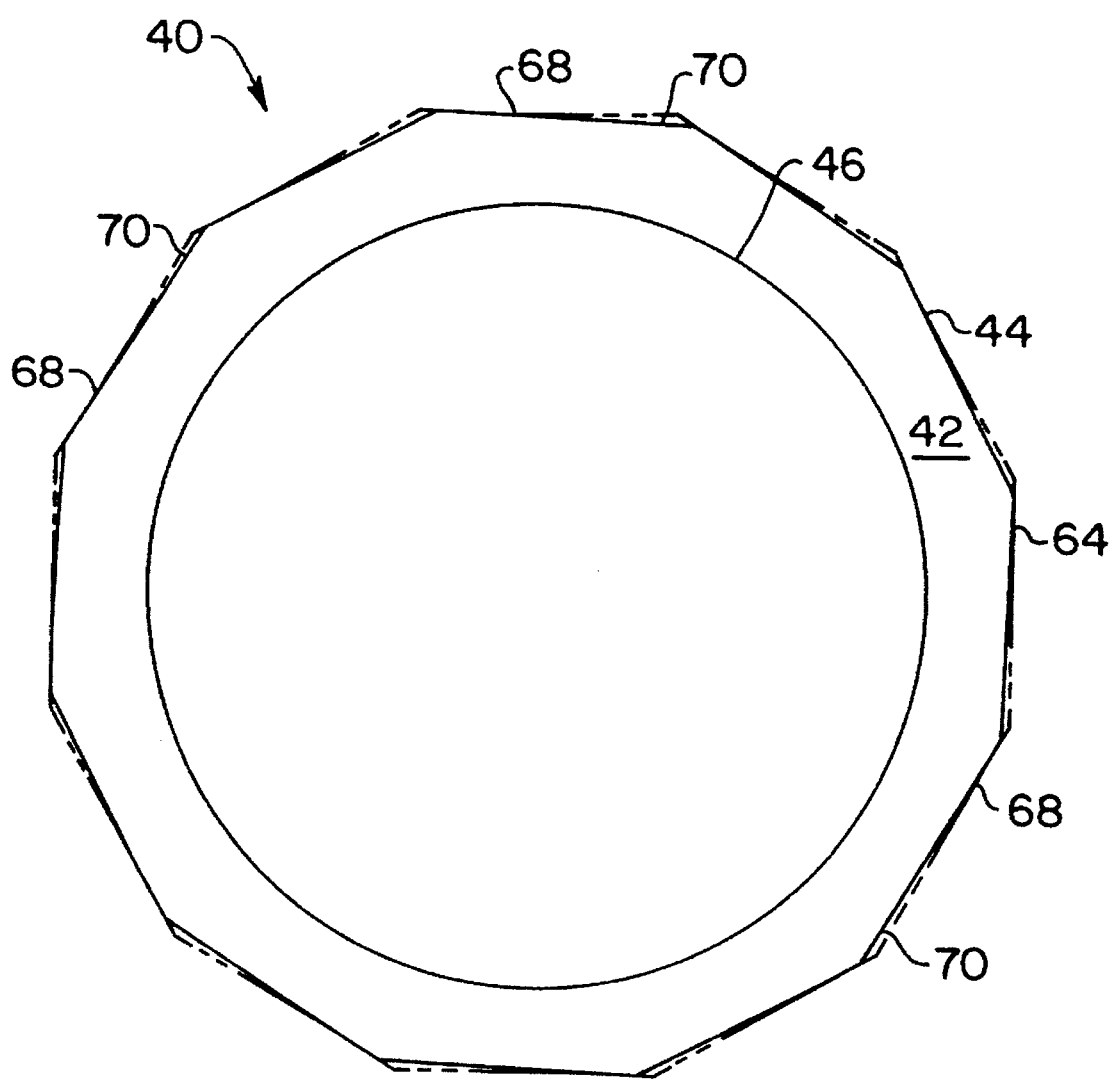
FIG. 2 is a plan view of a first annular friction member of the polygonal clutch assembly of FIG. 1.
Figure 3:
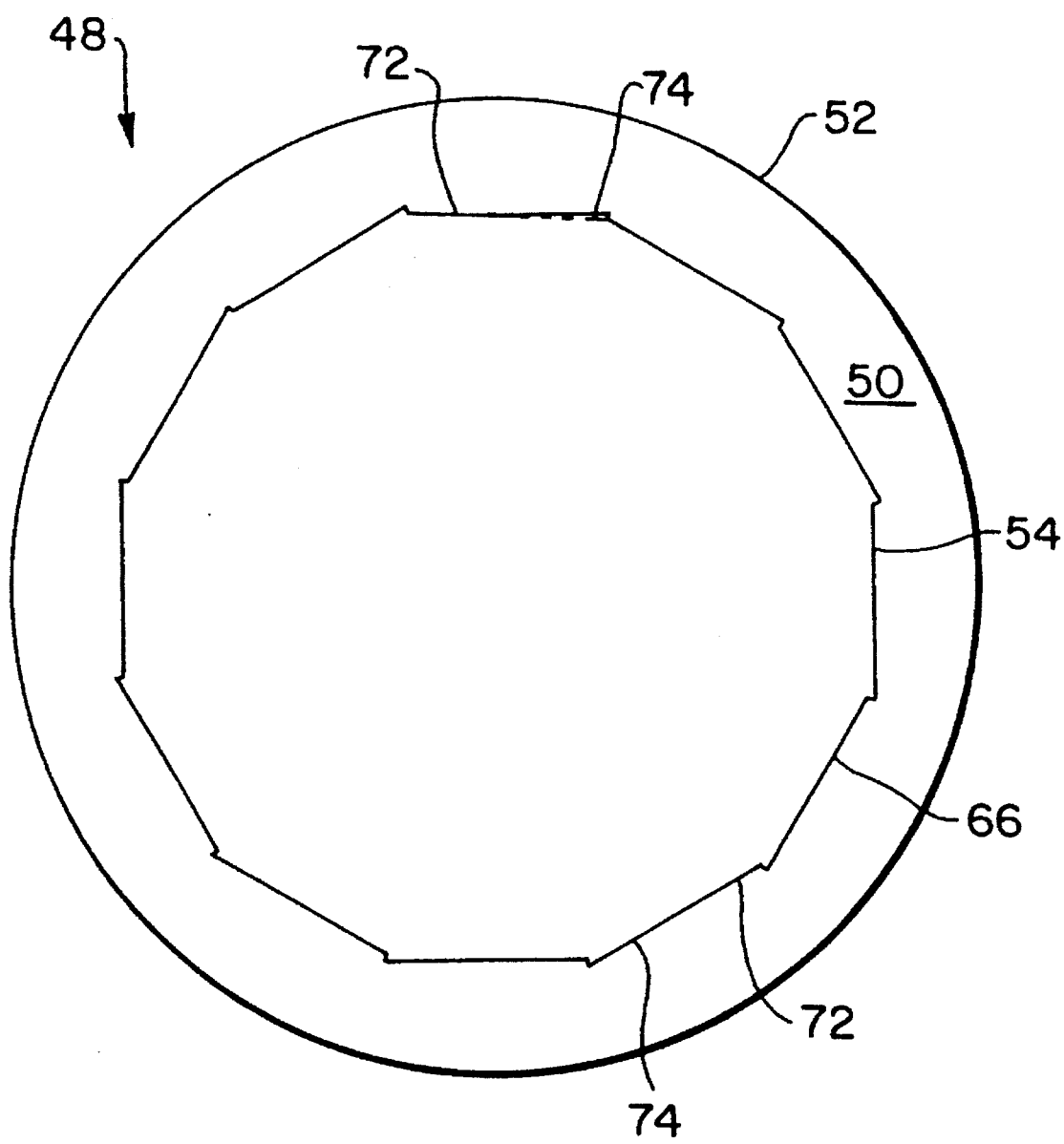
FIG. 3 is a plan view of a second annular friction member of the polygonal clutch assembly of FIG. 1.

More particularly, in the preferred embodiment, as shown in FIG. 2, the first generally inwardly facing inner peripheral surfaces 46 of the first annular friction members 40 have generally circular configurations that permit relative rotation. By comparison, the generally outwardly facing outer peripheral surfaces 44 of the first annular friction members 40 have generally polygonal configurations including polygon sides 64 having areas of contact 68 and, preferably, areas of relief 70. Similarly, as shown in FIG. 3, the second annular friction members 48 have circular and polygonal configurations on the outer and inner peripheral surfaces, respectively. Again, the polygonal configurations of the peripheral surfaces 54 of the second annular friction members 48 include polygon sides 66 having areas of contact 72 and, preferably, areas of relief 74. As described in more detail below, the areas of contact and relief are constructed and arranged to maximize the contacting areas between the annular friction members and the corresponding peripheral surfaces of the annular portions.

The annular friction members will now be described in greater detail. The preferred construction and arrangement of the first annular friction members 40 is based upon analytical studies of the applicant as presented hereinbelow. Preferably, the first annular friction members 40 should include twelve polygon sides 64. As one skilled in the art will recognize readily, however, the broadest concept of the invention would include a clutch having interengaging, polygonal cross-sectional configurations of any number of polygon sides greater than two. As shown in FIG. 2, each polygon side 64 of the first generally outwardly facing outer peripheral surfaces 44 of the first annular friction members 40 includes preferably an area of relief 70 disposed along a planar surface inclined towards the axis of rotation. As one skilled in the art will recognize readily, however, the broadest concept of the invention need not include the areas of relief 70. The area of relief 70 provides a surface that does not contact the facing polygon side 22 of the interior peripheral surface 20 of the exterior annular portion 18. An operable range of inclination of the areas of relief 70 is between 0 and ten degrees, while a preferred range is between 0 and five degrees. In the preferred embodiment, the areas of relief 70 are inclined by approximately three degrees. Further, the planar surfaces of the inclined areas of relief 70 are offset preferably from the center of the polygon side 64. The inclined areas of relief 70 may be positioned operably anywhere along the width of each polygon side 64. Preferably, the inclined areas of relief 70 are offset from the center of each polygon side 64. More preferably, the areas of relief 70 are offset approximately ten percent of the polygon side 64 width and extends to the adjoining area of contact 68. Adjoining the area of relief 70, each polygon side 64 includes the aforementioned area of contact 68 having a contour corresponding substantially to the contour of a polygon side of a true polygon. The dash lines in FIG. 2 show how the first generally outwardly facing outer peripheral surfaces 44 deviate preferably from a true twelve-sided polygon.

The second annular friction members 48 are constructed and arranged similarly. The preferred construction of the second annular friction members 48 is based upon analytical studies of the applicant as well. Again, the twelve-sided configuration is preferable and should not be considered limiting. As shown in FIG. 3, each polygon side 66 of the second generally inwardly facing inner peripheral surfaces 54 of the second annular friction members 48 also includes preferably an area of relief 74 disposed along a planar surface inclined towards the axis of rotation. Again, the broadest concept of the invention does not include areas of relief. As similarly disclosed above, the areas of relief 74 of the polygon sides 66 of the second inwardly facing inner peripheral surfaces 54 provide surfaces that do not contact the facing polygon sides 30 of the exterior periphery 28 of the interior annular portion 26. An operable range of inclination of the areas of relief 74 is between 0 and ten degrees, while a preferred range is between 0 and six degrees. In the preferred embodiment, the areas of relief 74 on the second annular friction members 48 are inclined by approximately four degrees. Further, the planar surface of the inclined areas of relief 74 begins substantially at a mid-point of the polygon side 66 and extends to the adjoining area of contact 72. In general, however, the inclined areas 74 may be positioned operably anywhere along the width of the polygon side 66. Adjoining the areas of relief 74, each polygon side 66 includes the aforementioned area of contact 72 having a contour corresponding substantially to the contour of a polygon side of a true polygon. The dash line in FIG. 3 shows how the second generally inwardly facing inner peripheral surfaces 54 deviate from a true twelve-sided polygon.

Thus, the areas of contact 68 and 72 of each polygon side 64 and 66 of the annular friction members 40 and 48 are spaced tangentially about a circle concentric with the axis of rotation and extending to the confining peripheral surfaces 20 and 28 of the annular portions 18 and 26. With such an arrangement, the areas of contact 68 of the first outwardly facing outer peripheral surfaces 44 of the first annular friction members 40 are operationally engaged to the inner periphery 20 of the exterior annular portion 18 so that the first annular friction members 40 are confined to rotate with the exterior annular portion 18. Similarly, the areas of contact 72 of the second generally inwardly facing inner peripheral surfaces 54 of the second annular friction members 48 are operationally engaged to the exterior periphery 28 of the interior annular portion 26 thereby confining the second annular friction members 48 to rotate with the interior annular portion 26. The preferred configuration of the axial series of annular friction members 34 including the areas of contact and the areas of relief maximizes the area of contact between the annular friction members and the corresponding annular portion thereby maximizing clutch efficiency.

Indeed, without the areas of relief on each polygon side, upon engagement, the peripheral surfaces of the annular portions would tend to rotate, in some small degree, relative to the annular friction members to which they were engaged thereby transmitting torque through linear contacts rather than planar contacts. A common example of such a condition is illustrated when a socket of a socket and rachet drive binds on the nut to which it was engaged. As with the nut, such loading on the edges of the polygon sides tends to round the edges or bind them against the facing surfaces of the annular portions. Thus, in a clutch having annular friction members without areas of relief on each polygon side, clutch efficiency is limited by the small area of contact provided by the edges of each polygon side of the annular friction members. To increase the area of contact, and to increase concomitantly clutch efficiency, the annular friction members are provided with areas of relief. Upon engagement, the areas of relief do not engage the facing surfaces of the annular portions, and the areas of contact transmit torque over their entire planar surface. Consequently, clutch efficiency is maximized.

The polygonal clutch assembly 10 according to the present invention also includes an actuable engaging device shown generally by the reference number 76. The actuable engaging device 76 includes a piston 78 mounted for axial movement relative to the hub 16 of the first rotational member 12 and the axial series of annular friction members 34. The piston 78 is disposed between the hub 16 and a vertical surface 80 forming the shoulder surface 56 of the first rotational member 12. The piston 78 is biased away from the annular friction members by a spring pack assembly 82. The spring pack assembly 82 is retained in position by a spring pack retaining plate 84, preferably fixed to the shaft. In the preferred embodiment of the present invention, the actuable engaging device 76 is operated by hydraulic pressure. As one skilled in the art will recognize readily, however, the engaging device 76 could be any suitable device that applies inwardly opposing forces to the axial series of annular friction members 34.

Figure 4:
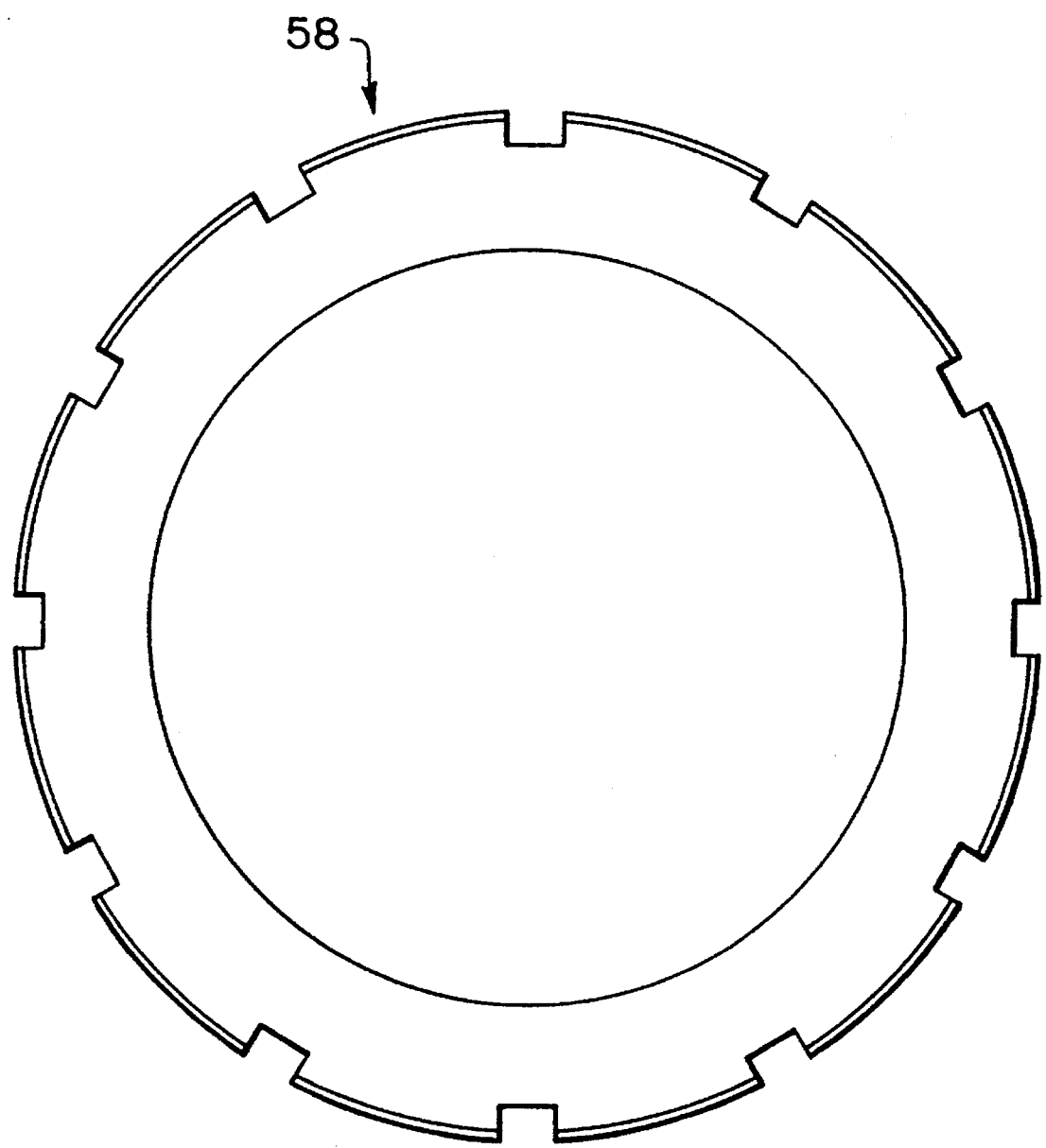
FIG. 4 is a spacer of the polygonal clutch assembly of FIG. 1.

Finally, the axial series of first and second annular friction members 34 is retained within the annular space 32 by a retaining mechanism 60. The retaining mechanism 60 includes positionable members 62 connected to an end surface of either of the annular portions. As shown in FIG. 5, the positionable members 62 are disposed on the end surface of the exterior annular portion 18 such that each polygon side includes a corresponding positionable member 62. Again as shown in FIG. 5, the end surface of the exterior annular portion 18 is contained within a first plane that is generally perpendicular to the axis of rotation. The positionable members 62 are movable from a position generally perpendicular to the first plane to a position generally parallel to the first plane. Once deformed to a position parallel to the first plane, the positionable members 62 abut the spacer 58 as shown in FIGS. 1 and 4. As constructed and arranged, the positionable members 62 retain and limit axial movement of the axial series of first and second annular friction members 34 within a length of the annular space 32 defined between the first plane and a second plane generally parallel to the first plane at the opposing end of the exterior annular portion 18. In the preferred embodiment of the present invention, the second plane is generally coextensive with the shoulder surface 56. In the preferred embodiment, the positionable members 62 are tabs 86 having generally inwardly facing surfaces 88 in adjoining relationship with the polygon sides 22 of the exterior annular portion 18. Finally, the tabs 86 are deformable plastically to a position generally parallel to the first plane.

The preferred manufacture, assembly and operation of the polygonal clutch assembly 10 will now be described by reference to FIGS, 1, 7, and 8. The rotational member having the exterior annular portion 18 is manufactured easily. A flat disk blank is drawn over a mandrel to form the first rotational member 12 including the interior periphery 20 of the exterior annular portion 18 having the polygonal configuration. Similarly, the second rotational member 24 is drawn over a twelve-sided die. The axial series of annular friction members 34 is stamped out from plate blanks. Any stamping process that produces square cut edges would be acceptable.

Initially, the shaft 14 is fixed to the hub 16 of the first rotational member 12 by any suitable means. Thereafter, the piston 78 is positioned in sliding relationship to the hub 16, and the spring pack 82 is positioned in abutting relationship to the piston 78. Next, the spring pack retaining plate 84 is positioned around and is attached to the shaft 14 securing the spring pack 82 against the piston 78. Thereafter, the first and second rotational members 12 and 24 are positioned in a coaxial and coextensive relationship. The second rotational member 24 includes an appropriate drive member, for example, a gear. Once the first and second rotational members so positioned, the axial series of first and second annular friction members 34, followed by the spacer 58, is axially mounted within the annular space 32 formed between the first and second rotational members. Thereafter, the tabs 86 are plastically deformed so that the tab surfaces 88 are positioned parallel to the first plane. In such a configuration, the spacer 58 and the axial series of first and second annular friction members 34 are retained within the annular space 32.

In the inoperative position—i.e., when the actuable engaging device 76 is retracted and the first and second annular friction members are not in contact—the first annular friction members 40 are free to rotate relative to the second annular friction members 48. Because of the polygonal configurations, the first annular friction members 40 are confined to rotate with the first rotational member 12 and, consequently, the drive shaft 14. The second annular friction members 48 are confined to rotate with the second rotational member 24 and, consequently, the gear 36. When hydraulic pressure is applied to the actuable engaging device 76, the piston 78 of that device moves axially toward the axial series of annular friction members 34. The piston 78 thereafter abuts the axial series of annular friction members 34 moving those members into operative engagement. The friction surfaces 42 and 50 of those members come into contact and cause the axial series of first and second annular friction members 34 to rotate together. Consequently, the first rotational member 12 is confined to rotate with the second rotational member 24 thereby transmitting torque from the drive shaft 14 to the gear 36. When the hydraulic pressure is released, the spring pack 82 biases the piston 78 of the actuable engaging device 76 away from the axial series of annular friction members 34. Thereafter, the axial series of first and second annular friction members moves axially out of operative engagement. Consequently, the first and second rotational members 12 and 24 are free to rotate relative to each other. Once the hydraulic pressure is released, the hydraulic oil is exhausted through holes 90 in the exterior annular portion 18. In the present embodiment, the hydraulic oil is supplied to the actuable engaging device 76 through holes and ports in the drive shaft 14.

While the invention has been described in connection with the preferred embodiment, it should be understood readily that the present invention is not limited to the disclosed embodiment. Rather, the present invention is intended to cover various equivalent arrangements including, for example, a twelve-sided polygonal clutch assembly and other arrangements included within the scope of the appended claims.

What is claimed is:

1. A clutch assembly for selectively engaging a drive assembly having an axis of rotation into operative association with a driven assembly having the axis of rotation for common rotation, comprising:

a first rotational member constructed and arranged to rotate with one of the drive assembly and the driven assembly, the first rotational member having an exterior annular portion;

a second rotational member constructed and arranged to rotate with the other one of the drive assembly and the driven assembly, the second rotational member having an interior annular portion positioned generally coaxially coextensive with the exterior annular portion of said first rotational member providing an annular space between an exterior periphery of the interior annular portion and an interior periphery of the exterior annular portion;

an axial series of first and second annular friction members within said annular space having generally axial facing, opposed, interengagable first and second friction surfaces and having first and second generally outwardly facing outer peripheral surfaces and first and second generally inwardly facing inner peripheral surfaces, said first and second annular friction members being mounted within said annular space for relative axial movement between an inoperative position wherein the first annular friction members having the first friction surfaces are capable of rotation relative to said second annular friction members having the second friction surfaces and an operative position wherein the first friction surfaces are operatively engaged to the second friction surfaces such that the first and second annular friction members are confined to common rotation;

the exterior periphery of the interior annular portion and the first and second generally inwardly facing inner peripheral surfaces being constructed and arranged so that the second generally inwardly facing inner peripheral surfaces are confined to rotate with the exterior periphery of the interior annular portion and the first generally inwardly facing inner peripheral surfaces are free to rotate relative to the exterior periphery of the interior annular portion;

the interior periphery of the exterior annular portion and the first and second generally outwardly facing outer peripheral surfaces being constructed and arranged so that the first generally outwardly facing outer peripheral surfaces are confined to rotate with the interior periphery of the exterior annular portion and the second generally outwardly facing outer peripheral surfaces are free to rotate relative to the interior periphery of the exterior annular portion;

an actuable engaging device constructed and arranged to apply inwardly opposing forces to the axial series of annular friction members axially moving the annular friction members from the inoperative position to the operative position thereby axially moving the first and second friction surfaces into operative engagement allowing the drive assembly to rotate the driven assembly when common rotation is desired; and the periphery of one of said annular portions and the peripheral surfaces confined to rotate therewith each having polygonal cross-sectional configurations and having respective interengaging polygon sides, wherein each of said interengaging polygon sides has an area of contact and an area of relief so as to provide spaced areas of contact between the periphery of said one of the annular portions and the peripheral surfaces confined to rotate therewith, said spaced areas of contact extending generally tangentially to a circle concentric with the axis of rotation and extending to the confined peripheral surfaces consequently allowing greater torque transmission by increasing clutch efficiency.

2. A clutch assembly according to claim 1, wherein both the interior periphery and the exterior periphery of said annular portions and the peripheral surfaces confined to rotate therewith have interengaging polygonal cross-sectional configurations.

3. A clutch assembly according to claim 1, wherein the clutch assembly further comprises a retaining mechanism having positionable members connected to an end surface of one of said annular portions, said end surface being within a first plane generally perpendicular to the axis of rotation, said positionable members being bent from said end surface to a position generally parallel to the first plane, said positionable members being constructed and arranged to limit axial movement of the first and second annular friction members within a length of the annular space defined between the first plane and a second plane generally parallel to the first plane at an opposing end of said annular portions and to retain the first and second annular friction members within the annular space when the positionable members are positioned generally parallel to the first plane.

4. A clutch assembly according to claim 1, wherein the area of relief of each side is disposed in adjoining relationship with an area of contact of an adjacent side so as to provide spaced areas of relief and spaced areas of contact, and so as to provide a maximum area of operable contact between said confined peripheral surfaces thereby providing a maximum clutch efficiency.

5. A clutch assembly according to claim 4, wherein said spaced areas of relief comprise planar surfaces inclined by an angle relative to said spaced areas of contact.

6. A clutch assembly according to claim 5, wherein said spaced areas of relief are disposed on the polygon sides of the peripheral surfaces of the annular friction members confined to rotate with one of said annular portions.

7. A clutch assembly according to claim 5, wherein said spaced areas of relief are disposed on the polygon sides of the outwardly facing outer peripheral surfaces of the first annular friction members.

8. A clutch assembly according to claim 7, wherein the angle is between 0 and 10 degrees.

9. A clutch assembly according to claim 7, wherein the angle is between 0 and 5 degrees.

10. A clutch assembly according to claim 7, wherein the angle is approximately 3 degrees.

11. A clutch assembly according to claim 7, wherein said planar surfaces are disposed in an offset relation from a center of said polygon sides.

12. A clutch assembly according to claim 7, wherein said planar surfaces are disposed in an offset relation approximately ten percent of a polygon side width from a center of said polygon sides.

13. A clutch assembly according to claim 5, wherein said spaced areas of relief are disposed on the polygon sides of the inwardly facing inner peripheral surfaces of the second annular friction members.

14. A clutch assembly according to claim 13, wherein the angle is between 0 and 10 degrees.

15. A clutch assembly according to claim 13, wherein the angle is between 0 and 6 degrees.

16. A clutch assembly according to claim 13, wherein the angle is approximately 4 degrees.

17. A clutch assembly according to claim 13, wherein said planar surfaces are disposed on the polygon sides beginning at a center of said polygon sides.

18. A clutch assembly according to claim 1, wherein the second generally outwardly facing outer peripheral surfaces and the first generally inwardly facing inner peripheral surfaces have generally circular configurations.

19. A clutch assembly according to claim 1, wherein a number of polygon sides of the periphery of said annular portion having the interengaging polygonal cross-sectional configuration equals a number of polygonal sides of the peripheral surfaces confined to rotate therewith.

20. A clutch assembly according to claim 1, wherein the periphery of said annular portion having the interengaging polygonal cross-sectional configuration has between 3 and 24 polygon sides.

21. A clutch assembly according to claim 1, wherein the periphery of said annular portion having the interengaging polygonal cross-sectional configuration has between 8 and 16 polygon sides.

22. A clutch assembly according to claim 1, wherein the periphery of said annular portion having the interengaging polygonal cross-sectional configuration has twelve polygon sides.

23. A clutch assembly according to claim 1, wherein the peripheral surfaces having the interengaging polygonal cross-sectional configuration has between 3 and 24 polygon sides.

24. A clutch assembly according to claim 1, wherein the peripheral surfaces having the interengaging polygonal cross-sectional configuration has between 8 and 16 polygon sides.

25. A clutch assembly according to claim 1, wherein the periphery of said annular portion having the interengaging polygonal cross-sectional configuration has twelve polygon sides.

26. A clutch assembly according to claim 2, wherein the interengaging polygonal cross-sectional configurations have the same number of polygon sides.

27. A clutch assembly according to claim 1, wherein the polygon sides of the interengaging polygonal cross-sectional configurations are of equal width.

28. A clutch assembly according to claim 1, wherein the polygon sides of the interengaging polygonal cross-sectional configurations are positioned between adjoining polygon sides such that an angle formed between the polygon side and adjoining polygon sides is the same.

29. A clutch assembly for selectively engaging a drive assembly having an axis of rotation into operative association with a driven assembly having the axis of rotation for common rotation, comprising:

a first rotational member constructed and arranged to rotate with one of the drive assembly and the driven assembly, the first rotational member having an exterior annular portion;

a second rotational member constructed and arranged to rotate with the other one of the drive assembly and the driven assembly, the second rotational member having an interior annular portion positioned generally coaxially coextensive with the exterior annular portion of said first rotational member providing an annular space between an exterior periphery of the interior annular portion and an interior periphery of the exterior annular portion;

an axial series of first and second annular friction members within said annular space having generally axial facing, opposed, interengagable first and second friction surfaces and having first and second generally outwardly facing outer peripheral surfaces and first and second generally inwardly facing inner peripheral surfaces, said first and second annular friction members being mounted within said annular space for relative axial movement between an inoperative position wherein the first annular friction members having the first friction surfaces are capable of rotation relative to said second annular friction members having the second friction surfaces and an operative position wherein the first friction surfaces are operatively engaged to the second friction surfaces such that the first and second annular friction members are confined to common rotation;

the exterior periphery of the interior annular portion and the first and second generally inwardly facing inner peripheral surfaces being constructed and arranged so that the second generally inwardly facing inner peripheral surfaces are confined to rotate with the exterior periphery of the interior annular portion and the first generally inwardly facing inner peripheral surfaces are free to rotate relative to the exterior periphery of the interior annular portion;

the interior periphery of the exterior annular portion and the first and second generally outwardly facing outer peripheral surfaces being constructed and arranged so that the first generally outwardly facing outer peripheral surfaces are confined to rotate with the interior periphery of the exterior annular portion and the second generally outwardly facing outer peripheral surfaces are free to rotate relative to the interior periphery of the exterior annular portion;

an actuable engaging device constructed and arranged to apply inwardly opposing forces to the axial series of annular friction members axially moving the annular friction members from the inoperative position to the operative position thereby axially moving the first and second friction surfaces into operative engagement allowing the drive assembly to rotate the driven assembly when common rotation is desired; and a retaining mechanism having positionable members connected to an end surface of one of said annular portions, said end surface being within a first plane generally perpendicular to the axis of rotation, said positionable members being bent from said end surface to a position generally parallel to the first plane, said positionable members being constructed and arranged to limit axial movement of the first and second annular friction members within a length of the annular space defined between the first plane and a second plane generally parallel to the first plane at an opposing end of said annular portions and to retain the first and second annular friction members within the annular space when the positionable members are positioned generally parallel to the first plane.

30. A clutch assembly according to claim 29, wherein the positionable members are deformable plastically to a position generally parallel to the first plane.

31. A clutch assembly according to claim 29, wherein the end surface of the annular portion on which the positionable members are tabs arranged has a polygonal cross-sectional configuration including polygon sides, each of said tabs being disposed in adjoining relationship with the polygon sides of said annular portion and bent therefrom to said position generally parallel to the first plane.

* * * * *